Figure 1:
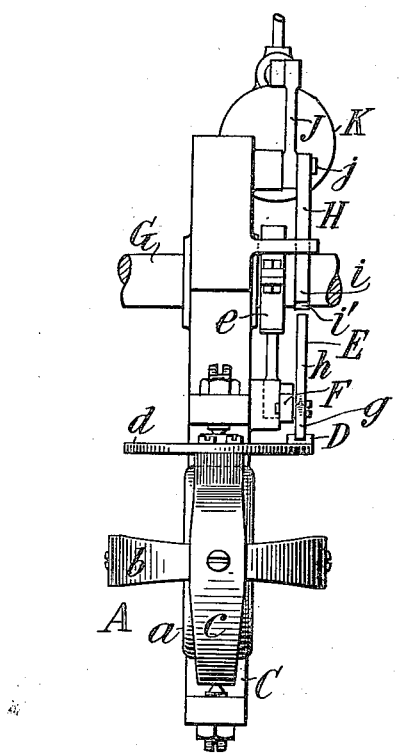

No. 795,045. PATENTED JULY 18, 1905.
F. M. LEAVITT.
GYROSCOPIC CONTROL APPARATUS.
APPLICATION FILED OCT. 27, 1904.

2 SHEETS—SHEET 1.

WITNESSES:
Fred White
René Bülöw

INVENTOR:
Frank M. Leavitt,
By Attorneys,
Arthur C. Fraser & Co.

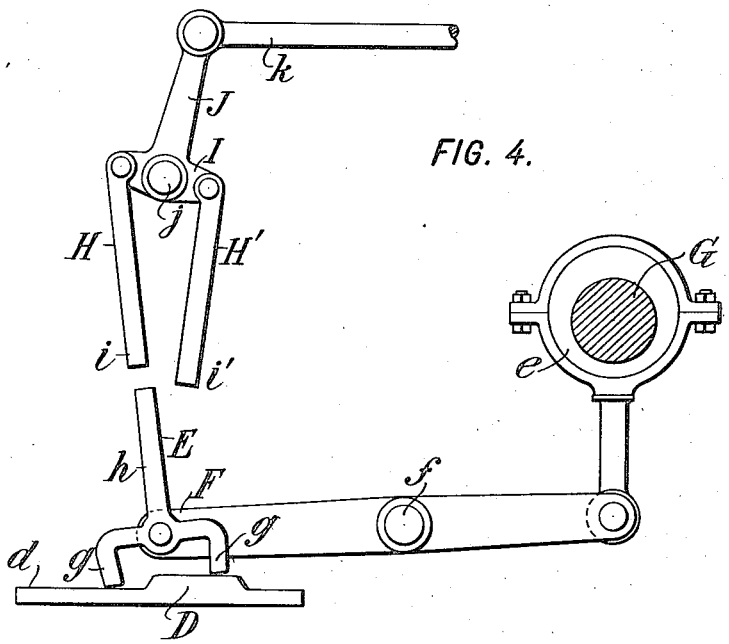
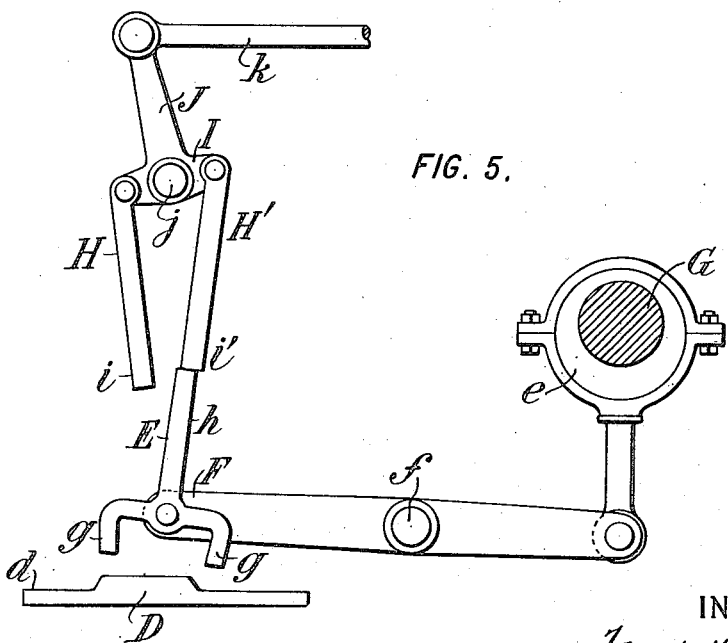

No. 795,045.                                              Patented July 18, 1905.

UNITED STATES PATENT OFFICE.

FRANK M. LEAVITT, OF NEW YORK, N. Y., ASSIGNOR TO E. W. BLISS COMPANY, OF BROOKLYN, NEW YORK, A CORPORATION OF WEST VIRGINIA.

GYROSCOPIC CONTROL APPARATUS.

SPECIFICATION forming part of Letters Patent No. 795,045, dated July 18, 1905.

Application filed October 27, 1904. Serial No. 230,276.

*To all whom it may concern:*

Be it known that I, FRANK M. LEAVITT, a citizen of the United States, residing in the borough of Brooklyn, county of Kings, city and State of New York, have invented certain new and useful Improvements in Gyroscopic Control Apparatus, of which the following is a specification.

For certain uses it is desirable to utilize the persistence of direction which is one of the characteristics of the philosophical instrument known as the "gyroscope." This instrument essentially comprises a mass (commonly in the form of a fly-wheel) symmetrically disposed around and rotating about an axis, together with a support for such axis permitting of universal motion with the minimum of friction. This support commonly consists of so-called "gimbal-rings." When such body or fly-wheel is in rapid rotation, it tends by reason of its inertia to maintain its plane of rotation unchanged, so that its rotative axis points constantly in one direction, and the support or foundation carrying it may be moved or turned without imparting any sensible deflection to such axis. For example, if the gyroscope be mounted upon a ship at sea and its fly-wheel set spinning with its axis pointing toward the pole-star the pitching, rolling, or yawing of the ship may not influence the gyroscope, so that notwithstanding such movements of the ship its axis should continue to point toward the pole-star so long as the rapid rotation of the fly-wheel is maintained. Various attempts have been made to utilize this property for practical purposes. For example, it has been proposed to apply the gyroscope principle for maintaining a level platform for a telescope on a ship, so that the telescope may be mounted independently of the movements of the ship. It has also been proposed to provide a ship with a universally-mounted platform, deck, or saloon designed to remain level notwithstanding the pitching or rolling of the ship, and to be controlled in such level position by means of a gyroscope acting to operate a valve which, through hydraulic mechanism, acts upon the platform to hold it level while reacting against the moving ship. It has been proposed to maintain such a level platform for the mounting of guns in ships of war. It has also been proposed to utilize the persistency of the gyroscope to determine the instant at which a gun should be discharged in order that it may be fired at the instant when its support, which moves with the ship, is level. The gyroscope has also been proposed for controlling the operation of the steering mechanism of a ship, this application having been found practically useful in the automobile torpedo. In the practical application of the gyroscope for any such purpose there is encountered the disadvantage that in operating or controlling any mechanism the gyroscope is required to exert some power or pressure, the reaction of which constitutes a disturbing force, which in proportion to its amount and duration influences the gyroscope, giving rise to the phenomenon known as "precession"—that is to say, the thrust exerted by the gyroscope is equivalent to a like and opposite thrust exerted against it and tending to deflect its axis. Such deflecting thrust or force causes the axis to move or "precess" not in the direction of such force, but in a direction substantially perpendicular thereto, such movement or precession occurring at a rate proportional to the force exerted and during the time that the force continues. Hence if such disturbing force is continued for a sufficient time it will result in a material deflection of the gyroscope such as to seriously impair its usefulness for the purpose intended. Recognizing this difficulty, efforts have been made to reduce the practical deflection of the gyroscope-axis to a negligible minimum by constructing the apparatus to be directly operated by the gyroscope as light and frictionless as possible, but with the disadvantage, however, of introducing undesirably delicate parts liable to break or get out of order. One of such means which has been proposed to minimize the work imposed upon the gyroscope has involved the introduction of an electric circuit, the gyroscope having only to close or break the circuit and the latter acting strongly through suitable electromagnets to operate the required mechanism; but this has been found unreliable in practice, with the result that at the instant when it is important that the gyroscopic control should be effective it is liable to become altogether incapacitated. It has also been proposed to neutralize the disturbing effect of the thrusts imparted by the gyroscope to the controlled mechanism by arranging that these thrusts shall mainly compensate one another by occurring in alternately-opposite directions; but this has only partially remedied the inherent difficulty.

My invention aims to provide a means for utilizing a gyroscope for controlling any other desired mechanism which shall impose so slight a reaction upon the gyroscope as to be practically negligible, which shall be free from any undesirable delicacy of construction, and which shall be capable of operating positively and strongly upon the control mechanism. To this end my invention provides an extremely light part which for convenience I will call a "feeler," which is pivoted to or otherwise mounted upon a rapidly-reciprocating part, which for convenience I will call the "carrier," and which is reciprocated by any suitable source of power. These parts are so mounted that the feeler moves toward and from some suitable part of the gyroscope, which part may advantageously be shaped as a cam, tappet, or the like, their relations being such that as the feeler moves toward the gyroscope it will encounter this cam or tappet if there has been any relative displacement between the main support and the gyroscope, and will be itself deflected thereby proportionally to such displacement, and on its return stroke after moving entirely out of contact with the gyroscope the feeler will impart an operative thrust or displacement to the mechanism which is to be controlled by the gyroscope. The feeler is so light that its touch against the gyroscope exerts a force so slight as to be practically inappreciable and which occurring for so brief a time is wholly without practical effect in deflecting the gyroscope. The movement of the carrier is so rapid that the feeler after being deflected to accord with the position of the gyroscope relatively to the main support has not time to fall from or otherwise lose this position during the retractile movement, and in the course of such movement it passes wholly out of reach of the gyroscope before it encounters the mechanism to be controlled, and being driven from an ample force of power it exerts a powerful thrust against the control mechanism to displace it to the position required to make it conform to any relative displacement occurring between the gyroscope and the support. Thus I accomplish an efficient and powerful operation of the mechanism to be controlled by the gyroscope with a deflecting force against the gyroscope so slight as to be practically neglible and without resort to any parts so frail or delicate as to be mechanically unreliable.

Having thus indicated the principle of my invention, I will proceed to set forth in detail its practical embodiment with reference to the accompanying drawings.

Figure 2:
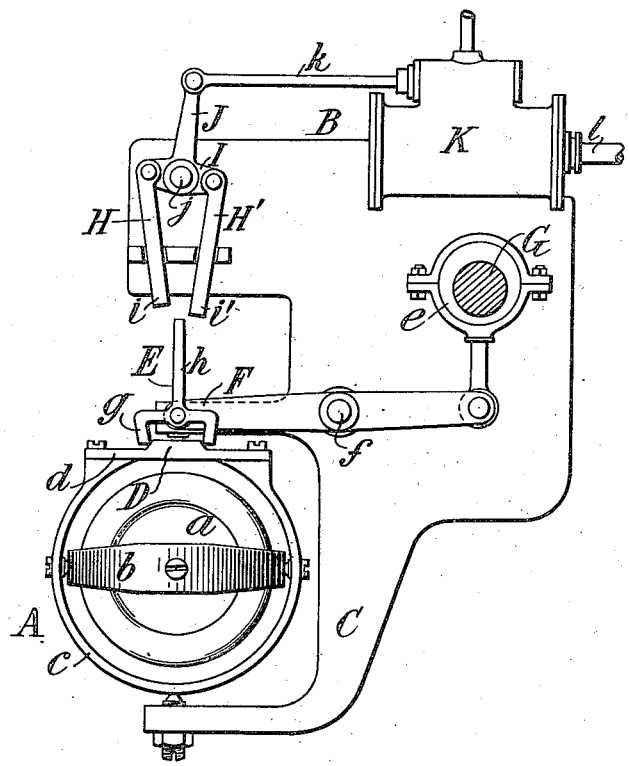
Figure 3:
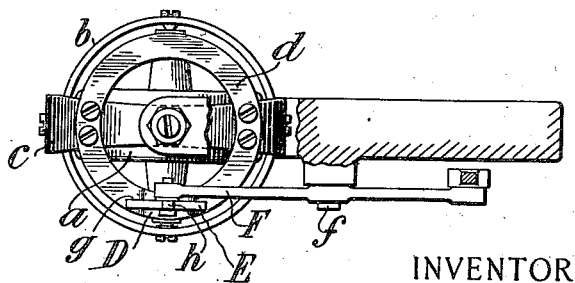

Figures 1 and 2 are elevations of a gyroscopically-controlled apparatus viewed at right angles to one another. Fig. 3 is a plan of a portion of said apparatus. Fig. 4 is a fragmentary elevation, on a larger scale, corresponding to part of Fig. 2. Fig. 5 is a similar view to Fig. 4, showing the parts in a different position.

Referring to the drawings, let A designate as a whole the gyroscope, and B the apparatus to be controlled.

The gyroscope A comprises a rotating mass or fly-wheel $a$, supported by a main support C through the medium of any suitable universal suspension, such as the well-known Cardan suspension or gimbal rings. As shown, the fly-wheel is hung between pivot points or screws carried in an inner gimbal-ring $b$, which in turn is hung on an axis at right angles to the fly-wheel axis between pivot points or screws in an outer gimbal-ring $c$, and this outer ring is in turn hung on an axis at right angles to the latter between pivot points or screws carried by the frame or main support C. With the arrangement shown the fly-wheel axis is horizontal and may be assumed to be fore and aft in case the structure is mounted on a ship. The axis uniting the two rings is horizontal and normally transverse, and the axis uniting the outer ring and the frame is vertical.

On some suitable part of the gyroscope and preferably on the outer ring $c$ is formed or mounted any suitable projection or tappet, which may advantageously be a cam D. As shown, this is constructed as a projection upon a ring or sector $d$, which is fastened to the outer ring $c$. A feeler E is arranged adjacent to the cam D in the normal position of the latter and is mounted upon any suitable carrier, so as to be caused to reciprocate rapidly toward and from the cam. The carrier may be any suitable moving part, being shown as one arm of a lever F, which lever is fulcrumed at $f$, its other arm being connected to an eccentric $e$ on a revolving shaft G, by means of which or by any other suitable means the lever F or other carrier is caused to reciprocate so as to move the feeler E alternately toward and from the cam or tappet on the gyroscope. The feeler E may be variously formed, being essentially a light movable piece of suitably stiff or strong material, as metal, adapted when moved toward and into contact with the cam or tappet to coact therewith and be set thereby to a position corresponding with the position of the gyroscope relatively to the support C and adapted when moved away from the cam or tappet to act against some part of the mechanism which is to be controlled by the gyroscope. In the preferred form shown the feeler is a three-armed piece or dog pivoted to the carrier F, having its two lower arms or toes $g$ $g$ arranged to engage the cam, while its upper arm $h$ is adapted to engage the mechanism to be actuated.

The mechanism to be acted upon by the arm $h$ of the feeler may be variously constructed and arranged. In the drawings it is shown as provided with two shoulders $i$ $i'$, formed in this instance by the lower ends of two rods H and H', which rods are pivoted at their upper ends to opposite arms of a lever I, which lever is fulcrumed at $j$ to some part of the main support, so that as either rod is pushed up the lever I is rocked and the other arm is pushed down. From the lever motion will be taken in any suitable manner to operate the apparatus to be actuated by the gyroscope, which, for example, may be the controlling-valve of an engine. One suitable construction is that shown, where the lever I is provided with an upper arm J, which engages the valve-rod $k$, operating the valve of a steam, air, or hydraulic cylinder K, which may constitute a steering or other engine, the piston-rod $l$ of which is connected to a rudder, movable platform, or other device to be ultimately actuated under control of the gyroscope. The particular construction of the mechanism to be so actuated forms no part of my invention and may be varied according to the particular use to which the structure is to be put.

Assuming now that the shaft G is revolving with suitable rapidity, so that the carrier F and feeler E are reciprocated toward and from the cam or equivalent part of the gyroscope and that the gyroscope fly-wheel is spun up to a suitable velocity by any known spinning-up means, (and assuming also, if desired, that any suitable means is provided for keeping the fly-wheel spinning if the period of operation of the mechanism is to be prolonged,) the operation will be as follows: Each time that the feeler moves toward the gyroscope its toes $g$ $g'$ lightly touch the cam or tappet D, so that according to the position of this cam the feeler receives a position therefrom which during the return or upstroke it preserves. For example, with the cam in the position shown in Fig. 2, which is that corresponding to what may be taken as the normal position of the fly-wheel axis relatively to the main support C, the toes $g$ $g$ of the feeler touch the inclined sides of the cam and the feeler is set to the central position shown, so that on its upstroke its arm $h$ passes freely up into the space between the two shoulders $i$ $i'$, so that it does not influence the mechanism B. If, however, the gyroscope should have turned so as to displace the cam D to either side, (or, more accurately stated, in case the ship or other structure to which the main support C is fastened should have turned so as to displace the feeler to either side with relation to the cam D, which has been held unmoved by reason of the fixity of direction of the gyroscope-axis,) then upon the next descent of the feeler one of its toes will strike nearer the top of the cam and the other nearer the bottom, as shown in Fig. 4, so that the feeler is tipped or tilted as there indicated, and so receives from the cam a new position, which in its return or ascending reciprocation is maintained, so that its arm $h$, now tilted to the left, encounters the left-hand shoulder $i$ and exerts an upward thrust thereon, which being transmitted through the rod H tilts the lever I so as to throw its upper arm J to the right, as shown. This movement is transmittted through the rod $k$ to the engine-valve or other part to be operated, so that the power of the engine is brought to bear to perform any desired work through its piston-rod $l$. In the case of an opposite relative movement of the parts—that is, assuming the main support C to be carried in the contrary direction relatively to the unmoved gyroscope with its cam D—there results a tipping of the feeler E in the contrary direction, so that its upper arm is thrown over to the right, as indicated in Fig. 5, in which view it is shown as having completed its upstroke, whereby it has pushed up the shoulder $i'$ and turned the lever I in the contrary direction.

It will be understood that the only work which is imposed upon the gyroscope is that of tipping the feeler E as the latter is moved into touch with it, since the thrust imparted by the feeler E to the shoulders $i$ or $i'$ does not commence until in its upward movement the feeler has been lifted entirely clear of the cam or tappet D. The feeler E is made as light as is consistent with the requisite strength, and in practice its touch against the gyroscope-ring, even when reciprocating at a rapid rate, is without appreciable effect. The slight thrust that it exerts is in line with the vertical axis of the outer ring and has no effect to deflect the gyroscope-axis. Theoretically the action of the toes $g$ against the inclined sides of the cam might be supposed to have some lateral wedging thrust, however minute, but practically the slight friction of the contact precludes any effective lateral thrust whatever. It results that the action of the feeler against the cam is ideally devoid of any disturbing effect upon the gyroscope. On the other hand, the action of the feeler against the shoulders $i$ $i'$ and through them by whatever intervening parts may be employed upon the mechanism to be controlled by the gyroscope is a positive action giving a powerful thrust, the power for which is taken from the constantly-rotating shaft G through the eccentric $e$ and lever F.

It will of course be understood that the power for reciprocating the feeler E may be derived from any other suitable source than a revolving shaft G and also that the mechanism actuated by the feeler may be variously modified, it being by no means essential that the shoulders $i$ $i'$, which are directly acted upon by the feeler, shall be formed on pins or slides H H' or that they shall be connected by a lever I or that the vibrations of this lever or other part shall be employed to operate an engine-valve. The construction shown is illustrated solely to give a concrete example of one suitable and desirable embodiment of my invention. Accordingly my invention is susceptible of a wide variety of modifications and of widely-different applications from those herein specifically set forth.

What I claim is—

1. The combination with a gyroscope and a mechanism to be controlled thereby, of a feeler and means for reciprocating it rapidly toward and from a part of the gyroscope, said feeler adapted on coming into touch with said part to be positioned thereby, and on receding therefrom to communicate movement to said mechanism according to its position.

2. The combination with a gyroscope and a mechanism to be controlled thereby, of a feeler, a rapidly-reciprocating carrier for said feeler moving the latter toward and from a part of the gyroscope, and a source of power reciprocating said carrier, said feeler adapted on coming into touch with said part to be positioned thereby, and on receding therefrom to communicate movement according to its position from said source of power to said controlled mechanism.

3. The combination with a gyroscope and a mechanism to be controlled thereby, the gyroscope provided with a cam, of a feeler and means for reciprocating it rapidly toward and from said cam, said feeler adapted on coming into touch with said cam to be positioned thereby, and a movable shoulder adapted to be encountered and displaced by said feeler on its receding movement, or not, according to its position, and to communicate such displacement to said controlled mechanism.

4. The combination with a gyroscope having a cam D, of a feeler E having toes $g$ $g$ adapted to engage said cam and an arm $h$, a carrier for said feeler adapted to reciprocate it rapidly toward and from said cam, and movable shoulders $i$ $i'$ adapted to be encountered and displaced by the arm $h$ of said feeler on its receding movement according to its position, and a mechanism to be controlled by the gyroscope actuated by said shoulders.

In witness whereof I have hereunto signed my name in the presence of two subscribing witnesses.

FRANK M. LEAVITT.

Witnesses:
ARTHUR C. FRASER,
FRED WHITE.